(12) United States Patent
Schulz et al.

(10) Patent No.: US 8,089,221 B2
(45) Date of Patent: Jan. 3, 2012

(54) SUPERVISION OF AN ILLUMINATION DEVICE

(75) Inventors: Volkmar Schulz, Stolberg (DE); Christoph Martiny, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 631 days.

(21) Appl. No.: 12/278,956

(22) PCT Filed: Feb. 1, 2007

(86) PCT No.: PCT/IB2007/050336
§ 371 (c)(1),
(2), (4) Date: Aug. 11, 2008

(87) PCT Pub. No.: WO2007/091195
PCT Pub. Date: Aug. 16, 2007

(65) Prior Publication Data
US 2010/0164387 A1 Jul. 1, 2010

(30) Foreign Application Priority Data
Feb. 10, 2006 (EP) .................................... 06101519

(51) Int. Cl.
*H05B 37/02* (2006.01)
(52) U.S. Cl. ........ 315/307; 315/308; 362/800; 362/154; 362/185

(58) Field of Classification Search .................. 356/405, 356/406, 416, 419; 315/151, 294, 307, 308; 250/216; 362/184, 185, 800
See application file for complete search history.

(56) References Cited

U.S. PATENT DOCUMENTS

| | | | |
|---|---|---|---|
| 5,965,873 A | 10/1999 | Simpson et al. | |
| 6,507,159 B2 * | 1/2003 | Muthu | 315/307 |
| 6,600,562 B1 * | 7/2003 | Chang | 356/405 |
| 2002/0171373 A1 * | 11/2002 | Muthu | 315/219 |
| 2003/0111533 A1 | 6/2003 | Chang | |
| 2003/0133117 A1 | 7/2003 | Chang | |
| 2004/0135522 A1 | 7/2004 | Berman et al. | |
| 2005/0062446 A1 | 3/2005 | Ashdown | |
| 2005/0122065 A1 | 6/2005 | Young | |

FOREIGN PATENT DOCUMENTS

| | | |
|---|---|---|
| WO | 02080625 A1 | 10/2002 |
| WO | 03058184 A1 | 7/2003 |

\* cited by examiner

*Primary Examiner* — Vibol Tan

(57) ABSTRACT

The invention relates to an illumination device (1) with a number of light emitters, for example LEDs (L1, L2, L3, L4) of individual emission spectra. Sensor units (D1, D2, D3, D4) can produce a vector of measurement signals (S1, S2, S3, S4) that represent the light output of a single active light emitter. Based on a linear relation obtained during a calibration procedure, a characteristic value of the light output of that light emitter (L1, L2, L3, L4) is then calculated from the measurement vector, wherein said characteristic value is based on the coefficients of a decomposition of the individual emission spectrum into basis functions.

20 Claims, 4 Drawing Sheets

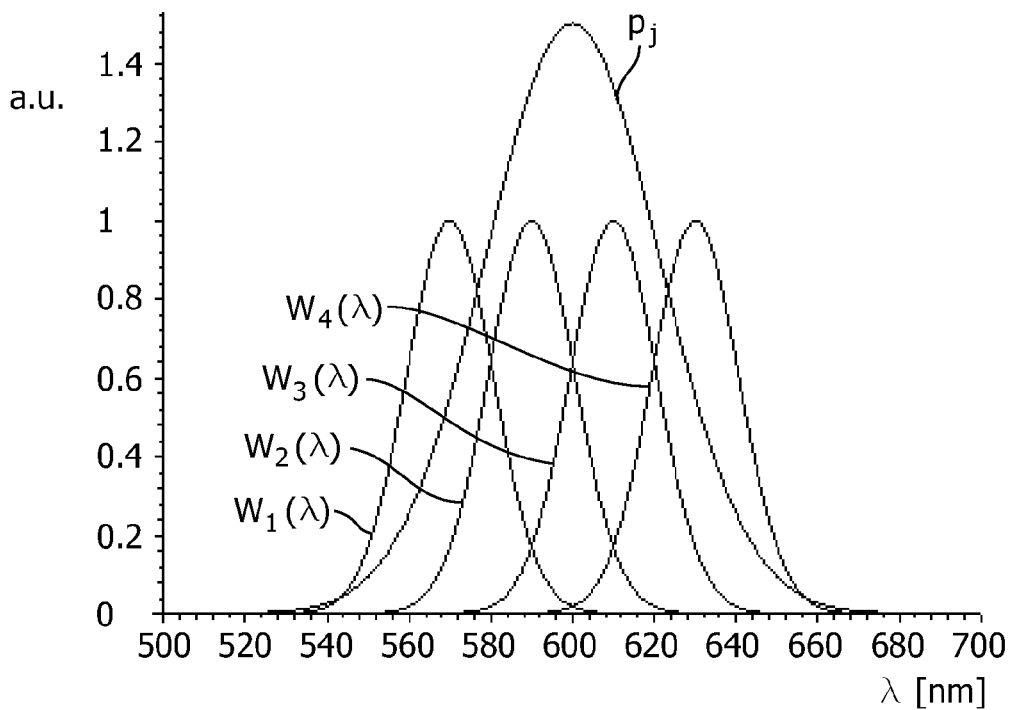

FIG. 3

$$\begin{bmatrix} S_{11} \\ S_{12} \\ S_{13} \\ S_{14} \end{bmatrix} = \begin{bmatrix} C_{11} & C_{12} & C_{13} & C_{14} \\ \vdots & \ddots & & \vdots \\ C_{14} & \cdots & & C_{44} \end{bmatrix} \begin{bmatrix} \alpha_{11} \\ \alpha_{12} \\ \alpha_{13} \\ \alpha_{14} \end{bmatrix}$$

$$\begin{bmatrix} S_{21} \\ S_{22} \\ S_{23} \\ S_{24} \end{bmatrix} = \begin{bmatrix} C_{11} & C_{12} & C_{13} & C_{14} \\ \vdots & \ddots & & \vdots \\ C_{14} & \cdots & & C_{44} \end{bmatrix} \begin{bmatrix} \alpha_{21} \\ \alpha_{22} \\ \alpha_{23} \\ \alpha_{24} \end{bmatrix}$$

$$\begin{bmatrix} S_{31} \\ S_{32} \\ S_{33} \\ S_{34} \end{bmatrix} = \begin{bmatrix} C_{11} & C_{12} & C_{13} & C_{14} \\ \vdots & \ddots & & \vdots \\ C_{14} & \cdots & & C_{44} \end{bmatrix} \begin{bmatrix} \alpha_{31} \\ \alpha_{32} \\ \alpha_{33} \\ \alpha_{34} \end{bmatrix}$$

$$\begin{bmatrix} S_{41} \\ S_{42} \\ S_{43} \\ S_{44} \end{bmatrix} = \begin{bmatrix} C_{11} & C_{12} & C_{13} & C_{14} \\ \vdots & \ddots & & \vdots \\ C_{14} & \cdots & & C_{44} \end{bmatrix} \begin{bmatrix} \alpha_{41} \\ \alpha_{42} \\ \alpha_{43} \\ \alpha_{44} \end{bmatrix}$$

FIG. 4

$$\begin{bmatrix} \alpha_{11} & \alpha_{21} & \alpha_{31} & \alpha_{41} \\ \alpha_{12} & \alpha_{22} & \alpha_{32} & \alpha_{42} \\ \alpha_{13} & \alpha_{23} & \alpha_{33} & \alpha_{43} \\ \alpha_{14} & \alpha_{24} & \alpha_{34} & \alpha_{44} \end{bmatrix}^{-1} \begin{bmatrix} S_{11} & S_{21} & S_{31} & S_{41} \\ S_{12} & S_{22} & S_{32} & S_{42} \\ S_{13} & S_{23} & S_{33} & S_{43} \\ S_{14} & S_{24} & S_{34} & S_{44} \end{bmatrix} = \begin{bmatrix} C_{11} & C_{12} & C_{13} & C_{14} \\ \vdots & \ddots & & \vdots \\ & & & \\ C_{14} & \cdots & & C_{44} \end{bmatrix}$$

FIG. 5

$$X = \sum_{k=1}^{4} \alpha_k \underbrace{\int_{\lambda_{1,low}}^{\lambda_{1,upper}} W_k(\lambda) \cdot \underline{x}(\lambda) \cdot d\lambda}_{=: \gamma_{xk}}$$

$$Y = \sum_{k=1}^{4} \alpha_k \underbrace{\int_{\lambda_{1,low}}^{\lambda_{1,upper}} W_k(\lambda) \cdot \underline{y}(\lambda) \cdot d\lambda}_{=: \gamma_{yk}} \quad \Leftrightarrow \quad \begin{pmatrix} X \\ Y \\ Z \end{pmatrix} = \Gamma \cdot \underline{\alpha}$$

$$Z = \sum_{k=1}^{4} \alpha_k \underbrace{\int_{\lambda_{1,low}}^{\lambda_{1,upper}} W_k(\lambda) \cdot \underline{z}(\lambda) \cdot d\lambda}_{=: \gamma_{zk}}$$

FIG. 6

SUPERVISION OF AN ILLUMINATION DEVICE

The invention relates to an illumination device comprising a light emitter and sensor units. Moreover, it relates to a method for the supervision of such an illumination device.

From the US 2003/0133117 A1, an illumination device is known that comprises red, green and blue Light Emitting Diodes (LEDs) and corresponding sensor units with maximal sensitivity in the spectral range of red, green and blue, respectively. The tri-stimulus color point (X, Y, Z) of the whole illumination device is estimated as a linear function, i.e. a matrix product, of the measurement signals. To achieve higher accuracy, it is however necessary to include also higher order products in the calculation.

Based on this situation it was an object of the present invention to provide means for a simple and accurate supervision of an illumination device with several light emitters.

This object is achieved by an illumination device according to claim 1 and a method according to claim 2. Preferred embodiments are disclosed in the dependent claims.

According to its first aspect, the invention relates to an illumination device comprising the following components:
a) At least one light emitter with an individual light output. The light emitter may be a single lamp or a combination of several, identical or distinct lamps.
b) At least two sensor units for producing measurement signals that correspond to the individual light output of the aforementioned light emitter. The "light output" of a light emitter is typically defined by its spectrum, i.e. as the wavelength-dependant emitted light intensity per unit wavelength (unit: W/nm). During a measurement, this spectrum is convoluted with the spectral sensitivity curve of the measuring device.
c) An estimation unit for estimating from the aforementioned measurement signals at least one characteristic value of the individual light output of the light emitter, wherein said characteristic value is based on the coefficients of a decomposition of the spectrum of the light emitter into a given set of basis functions. Preferably, one or more characteristic values are determined sequentially for a plurality of light emitter present in the illumination device (optionally for all light emitters of the device), wherein said characteristic values may be of the same type or not.

The aforementioned basis functions serve as a kind of virtual light emitters which commonly reproduce the spectrum of the light emitter under consideration if they are operated according to the decomposition coefficients. By approximating the spectrum of a light emitter with basis functions, the spectrum can be characterized with good accuracy by a limited number of values (the coefficients). This reduction of complexity allows a simplified handling of the individual spectra, for example by linear relations. Of course not only the spectrum of one light emitter, but also the spectra of all light emitters of an illumination device can be characterized by coefficients of a decomposition into given sets of basis functions.

According to a second aspect, the invention relates to a method for the supervision of an illumination device with at least one light emitter. The method comprises the following steps:
a) The production of measurement signals that correspond to the individual light output of said light emitter.
b) The estimation of at least one characteristic value of the individual light output of the light emitter from the aforementioned measurement signals, wherein said characteristic value is based on the coefficients of a decomposition of the spectrum of the light emitter into a given set of basis functions.

The method comprises in general form the steps that can be executed with an illumination device according to the first aspect of the invention. Therefore, reference is made to the preceding description for more information on the details, advantages and improvements of that method.

In the following, preferred embodiments of the invention are described that relate both to an illumination device and a method according to the invention.

In practice, an illumination device will typically comprise two or more light emitters that can be operated independently and that can hence also be measured separately by the sensor units. In this case, a characteristic value can be estimated for each of the light emitters. While in general each light emitter could be associated with a different set of basis functions, it is preferred to simplify the handling by using the same set of basis functions for the spectra of all light emitters.

The shape of the basis functions is arbitrary as long as they are able to characterize or reproduce the spectra with sufficient accuracy. As the general form of a spectrum of a light emitter is usually known in advance, the basis functions are preferably chosen such that they can approximate any concrete spectrum of this form with sufficient accuracy. The basis functions may for example be bell-shaped. This allows to compose a given spectrum based on localized contributions. Moreover, the basis functions may be piece-wise linear, polynomials, b-splines, or of any other form that is suited to approximate a particular spectrum of a light emitter.

Moreover, the number of basis functions that are used to (de)compose a given spectrum is in principal arbitrary. Preferably, said number is however identical to the number of available independent measurement signals (i.e. to the number of independent sensor units in the illumination device). In this case, the measurement signals provide just enough information to determine the coefficients of the decomposition of a given spectrum into basis functions.

With the decomposition coefficients, the spectrum itself is (at least approximately) known. Thus any value that depends on the spectrum can be determined, too. In a particularly important example, the color point (with respect to a predetermined color space) of the light emitter is calculated from the decomposition coefficients.

In the general case, the relations between the characteristic value cv, the decomposition coefficients $\alpha$, and the measurement signals S may be arbitrary, particularly non-linear. An easier mathematical handling is however possible if at least some of the relations in the composite mapping $S \to \alpha \to cv$ are linear.

Thus there may for example be a linear relation $\alpha \to cv$ between the characteristic value and the decomposition coefficients, wherein said relation is preferably described by a (coupling) matrix.

Moreover, there may be a linear relation $S \to \alpha$ between the measurement signals and the decomposition coefficients, wherein said relation is preferably also described by a matrix.

Finally, there may be a linear relation $S \to cv$ between the characteristic value and the measurement signals. This is particularly the case if the aforementioned two linear relations exist.

If one or more of the aforementioned linear relations exist, the processing of the vector of measurement signals can (at least partially) be done by a simple and fast matrix multiplication, wherein the coefficients of said matrix are typically calculated and stored in advance.

In a preferred embodiment of the aforementioned cases, the coefficients of the linear relations (i.e. the components of the associated matrices) are determined in a calibration procedure that comprises the isolated operation of only one of the light emitters (if several are present). By operating each light emitter separately, its contribution to the measurement signals can be filtered out and captured in the coefficients of the linear relationship.

According to a further refinement of the aforementioned calibration procedure, the light emitters operated in isolation are measured under different operating conditions, for example at different currents, temperatures and the like. Thus the range of spectra that can be generated by said light emitter will be explored and captured in the coefficients of the linear relationship.

In one embodiment of the illumination device and/or the method, the measurement signals are produced by sensor units with different spectral sensitivity curves. Different spectral sensitivity curves guarantee that the measurement signals represent independent characterizations of the emitted spectra.

In a further development of the aforementioned embodiment, the sensor units comprise a photodiode that is covered with a dielectric layer. By choosing the dielectric material and/or the specific thickness of that dielectric layer appropriately, different periodic filtering behaviors can be achieved such that the combination of dielectric layer and photodiode displays an oscillating sensitivity curve that extends over the whole spectral range of the illumination device. The dielectric layer preferably comprises silicon dioxide ($SiO_2$), titanium dioxide ($TiO_2$) and/or silicon nitride ($Si_3N_4$). The thickness of the dielectric layer is preferably in the range of 50 nm to 2.5 µm, most preferably the range of 100 nm to 800 nm. The dielectric layer may be of uniform thickness over the whole photodiode. Alternatively, the thickness of the dielectric layer may vary, e.g. if the layer has the form of a wedge. The dielectric material should be transparent to the light that is to be detected.

If the sensor units comprise a photodiode, it is preferred that this photodiode is integrated into a substrate on which the light emitters are mounted. The substrate may for example be silicon (Si).

According to a further embodiment of the invention, the illumination device comprises a controller that is adapted to drive the one or more light emitters individually based on the estimated characteristic value(s). The controller may for example drive several light emitters such that their common light emission optimally matches a given color point. In this respect, an "optimal match" means that the light output of the illumination device (i) exactly meets a predetermined color point, or (ii) approaches said color point in a predetermined color space with a predetermined metric of color-distances as close as it is possible with the used light emitters. Suitable controller designs for achieving a feedback control of light emission of the illumination device can readily be designed by persons skilled in the art. Examples of suited controllers may further be found in literature (cf. for example US 2005/122065 A1, US 2003/111533 A1, US 2005/062446 A1). In a preferred embodiment, the controller includes a storage (e.g. RAM, ROM, EPROM, hard disk or the like) which comprises calibrated relations between relevant quantities.

In principle, any geometrical arrangement of light emitters and sensor units is possible. In a preferred embodiment, the sensor units are disposed in a distributed way between the light emitters. If the light emitters are for example LEDs that are disposed in a matrix arrangement in a plane, one sensor unit can be disposed between each two neighboring light emitters.

These and other aspects of the invention will be apparent from and elucidated with reference to the embodiment(s) described hereinafter. These embodiments will be described by way of example with the help of the accompanying drawings in which:

FIG. 3 shows an example of the decomposition of the spectrum of a light emitter into basis functions;

FIG. 4 shows linear equations relating measurement signals and decomposition coefficients during a part of a calibration procedure;

FIG. 5 shows the calculation of a coupling matrix C from the calibration of FIG. 5;

FIG. 6 illustrates the calculation of a color point of a light emitter based on the decomposition coefficients of its spectrum.

Like reference numbers in the Figures refer to identical or similar components.

Figure 1:
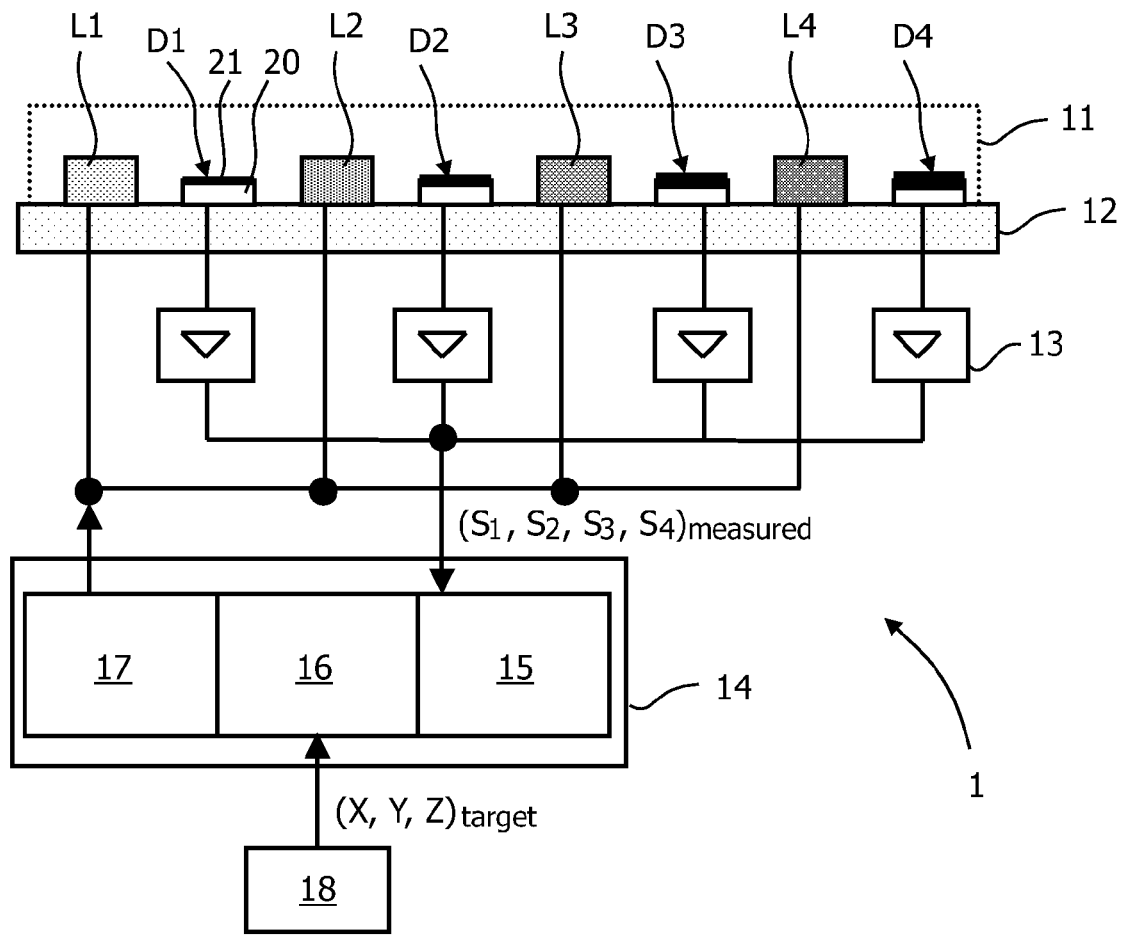
FIG. 1 shows a schematic sketch of an illumination device according the present invention.

FIG. 1 schematically shows one embodiment of an illumination device 1 according to the present invention. The device comprises four LEDs (or strings of LEDs) L1, L2, L3, and L4 with different colors—e.g. green, red, blue and amber—disposed on a substrate 12 and integrated into an optic 11. Adjacent to the four LEDs, four sensor units D1, D2, D3, and D4 are mounted on the surface of the substrate 12 for measuring the light output of the LEDs L1-L4. In general, the illumination device could consist of k sensors and n light emitters of primary colors, i.e. the Figure shows the particular case of k=4 and n=4.

Figure 2:
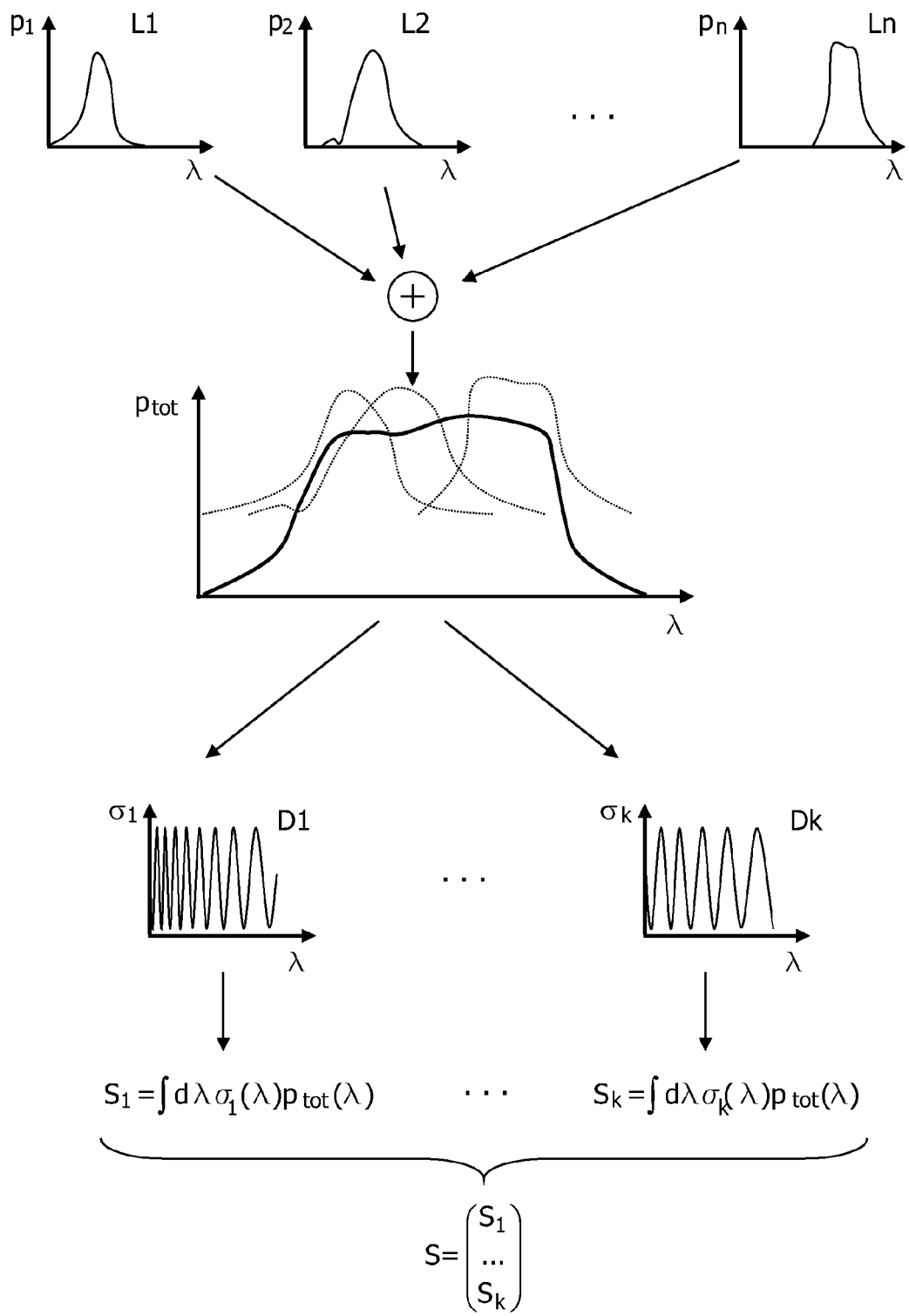
FIG. 2 illustrates the composition of the common light output of an illumination device from the contributions of different light emitters and the generation of the vector of measurement signals with different sensitivity curves.

FIG. 2 illustrates in the lower diagrams the spectral sensitivity σ (or, equivalently, the sensor signal under monochromatic illumination of wavelength λ with given intensity) in arbitrary units for the sensor units D1, . . . D4. It can be seen that the sensitivity curves oscillate quasi-periodically and extend across the whole relevant spectral range, i.e. from wavelengths λ less than 400 to more than 800 nm. Such sensitivity curves may for example be produced by single-layered dielectric filter photodiodes 20 having single layers 21 of $SiO_2$ on top with a thickness from 1 µm to 2.5 µm. Because of their low complexity, such sensor units with single-layered dielectric filters (SDF) can easily be integrated into the substrate 12.

FIG. 1 further shows that the signals (e.g. photo currents) of the sensor units D1, D2, D3, and D4 are amplified by amplifiers 13 and then sent to an "estimation unit" 15 which is part of a control unit 14. The control unit 14 further comprises a "color control unit" 16 and LED drivers 17. The color control unit 16 compares for example a color point determined by the estimation unit 15 from the measured signals $(S_1, S_2, S_3, S_4)_{measured}$ with a target color point $(X, Y, Z)_{target}$ provided by an external input 18. Based on the result of this comparison, the color control unit 16 sends adjusted drive signals to the LED drivers 17, which are coupled to the LEDs L1, L2, L3 and L4 and which adjust the average light of the LEDs by adjusting the amplitude of the (average) currents to them.

FIG. 2 illustrates spectral relations underlying an operation of an illumination device of the kind described above. In the upper part of FIG. 2, the individual spectra $p_1, p_2, \ldots p_n$ of light emitters L1, L2, . . . Ln are shown. By superposition, these individual spectra generate the common spectrum $p_{tot}$ shown in the middle of the Figure. In the lower part of the Figure, the already mentioned sensitivity curves $\sigma_1, \ldots \sigma_k$ are shown that correspond to sensor units D1, ... Dk. The common spectrum $p_{tot}$ is measured with these sensitivity curves to yield the measurement values $S_1, \ldots S_k$, which can be assembled to a measurement vector S.

An objective of the present invention is now to estimate efficiently characteristic values of the individual spectra $p_1$, $p_2, \ldots p_n$ (or, more generally, of the individual light outputs) from a measurement vector S that was obtained from the measurement of the individual spectra $p_1, p_2, \ldots p_n$.

In the solution proposed here, the individual spectra $p_j$ of the light emitters are decomposed into a linear combination of spectral basis functions $W_i$.

The aforementioned spectral basis functions $W_i$ may be the same for all light emitters. In general, each light emitter may however require an own set of spectral basis functions to make an accurate fit with a reasonable small number of coefficients possible. This is for example the case for small bandwidth emitters like LEDs. That means for an R,G,B-system with 4 sensors, there will be preferably in total 16 (e.g. bell-shaped) spectral basis functions grouped in four packets of four functions each, where those four functions contained in one group will preferably be located approximately at the wavelength-position of the LED to fit. To simplify the following discussion, it will be assumed that the spectral basis functions are the same for all emitters (or a dependence of the basis functions on the considered emitter will at least not be particularly pointed out).

FIG. 3 shows an exemplary set of four spectral basis functions $W_1$, $W_2$, $W_3$, and $W_4$ together with an individual spectrum $p_j$ of one light emitter. In this example, the basis functions are bell-shaped and normalized. Moreover, their total number of four is identical to the number of sensor units in the illumination device. The spectrum $p_j$ under consideration can then be described in terms of four coefficients or weights ($\alpha_1$, $\alpha_2$, $\alpha_3$, $\alpha_4$) which may be determined by minimization of the following formula:

$$\left\| \int_{\lambda\,low}^{\lambda\,high} \left( \sum_{k=1}^{4} \alpha_k W_k(\lambda) - p_j(\lambda) \right)^2 d\lambda \right\| \xrightarrow[\alpha_k]{} \min \quad (1)$$

Thus, the shape of the emission spectrum $p_j$ is reconstructed by the weighting factors $\alpha_k$ in a least square sense. Peak width and peak position of the spectral basis functions are chosen in a way that they will result in a suitable prediction of the LED spectra. Obviously more than four spectral basis functions can be used in order to give more accuracy in the prediction of the emission spectra of the LEDs. Basic idea of this approach is the use of the spectral basis functions $W_k$ as a kind of virtual light emitters.

In the following, "coupling matrices" will be applied that describe for each light emitter a linear relationship between the vector $\alpha^T = (\alpha_1, \alpha_2, \alpha_3, \alpha_4)$ of weights and the vector S of measurement signals. For a particular light emitter (e.g. LED L1), the associated coupling matrix C can be determined by the following calibration procedure:

Step 1: The illumination device is placed in an environmental light shielded (dark) room. The LED L1 is switched on, and a spectrometer is placed outside the device in order to measure the emission spectrum of the LED. Based on these data the values ($\alpha_{11}, \alpha_{12}, \alpha_{13}, \alpha_{14}$) are calculated using equation (1). Moreover, the measurement signals ($S_{11}, S_{12}, S_{13}$, $S_{14}$) are recorded by the on-board sensor units D1, ... D4 of the illumination device. Thus the vectors S and $\alpha$ of the equation S=C·$\alpha$ are known. In order to determine the matrix C, this experiment has to be repeated three times under different conditions:

Step 2-4: Same as step 1, but with other (e.g. higher) current and temperature in order to stimulate spectral shifts of the LED L1. As shown in FIG. 4, steps 1-4 yield four independent matrix equations in which C is the only unknown. C can therefore be calculated by inversion (FIG. 5). Once the matrix C is known, the decomposition coefficients ($\alpha_1$, $\alpha_2$, $\alpha_3$, $\alpha_4$) of an actual spectrum can be readily calculated by a simple matrix multiplication of a vector S obtained in a measurement of the separately operated LED L1 with the inverse of C, i.e. by the formula $\alpha = C^{-1} \cdot S$.

Step 5: In a further step, the color point (X,Y,Z) of the LED L1 can be calculated by the equations shown in FIG. 6 based on the estimated decomposition coefficients ($\alpha_1$, $\alpha_2$, $\alpha_3$, $\alpha_4$), the corresponding basis functions $W_1$, $W_2$, $W_3$, $W_4$, and the CIE 1931 Standard Observer color functions $x(\lambda)$, $y(\lambda)$, and $z(\lambda)$ (or any other functions that define a desired color space). The coefficients $\gamma_{xk}$, $\gamma_{yk}$, and $\gamma_{zk}$ of FIG. 7 are the components of a (3×4) matrix $\Gamma$ that can be calculated in advance via the corresponding overlap integrals and stored in the controller of the illumination device.

The steps 1 to 5 have to be repeated with all other primary colors (i.e. LEDs or LED-Strings) to yield corresponding matrices C', C" etc. Steps 1 to 4 have to be done once per illumination device, maybe only once per production line (if the sensors are that reproducible that the coefficients of the C-matrices remain the same from device to device). Step 5 will be done during the color point control.

In summary, the described approach provides a solution to acquire spectral information of primary colors (LED-strings) using optical sensors with non-uniform broad-band sensitivity. The emission peak of each primary color is described in terms spectral basis functions using a coupling matrix technique. This coupling matrix converts the sensor-signals to the weighting factors of the spectral basis functions. The tristimulus values are calculated directly. Thus this technique allows driving the LEDs with different currents or current patterns (e.g. ripples) in order to adjust the target color point.

The principles of the present invention can be applied to multi-primary colored lamps, preferably based on LEDs or phosphor-converted LEDs.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An illumination device, comprising:
   at least one light emitter;
   at least two sensor units for producing measurement signals that correspond to the individual light output of the light emitter;
   an estimation unit for estimating from the signals of the sensor units at least one characteristic value of the individual light output of the light emitter, wherein the characteristic value is based on the coefficients of a decomposition of the spectrum of the at least one light emitter into a given set of spectral basis functions, each spectral basis function defining a light output level as a function of wavelength.

2. A method for the supervision of an illumination device with at least one light emitter, comprising:
producing measurement signals that correspond to the individual light output of the light emitter;
estimating at least one characteristic value of the individual light output of the light emitter from the measurement signals, wherein the characteristic value is based on the coefficients of a decomposition of the spectrum of the light emitter into a given set of spectral basis functions, each spectral basis function defining a light output level as a function of wavelength.

3. The illumination device of claim 1, wherein the illumination device comprises a plurality of such light emitters that can be measured separately, wherein the characteristic values of these light emitters are based on the coefficients of a decomposition of the spectrum of each light emitter into given sets of spectral basis functions.

4. The illumination device of claim 1, wherein the illumination device comprises at least two such light emitters that can be measured separately and for which the set of spectral basis functions is the same.

5. The illumination device of claim 1, wherein the spectral basis functions are chosen with respect to the expected form of the spectrum, including at least one of bell-shaped, piece-wise linear, polynomials and b-splines.

6. The illumination device of claim 1, wherein the number of spectral basis functions is identical to the number of measurement signals.

7. The illumination device of claim 1, wherein the color point of the light emitter is calculated from the coefficients.

8. The illumination device of claim 1, wherein there is a linear relation between the characterized value and the coefficients, wherein the relation is preferably described by a matrix.

9. The illumination device of claim 1, wherein there is a linear relation between the measurement signals and the coefficients, wherein the relation is preferably described by a matrix.

10. The illumination device of claim 1, wherein there is a linear relation between the characteristic value and the measurement signals.

11. The illumination device of claim 8, wherein the coefficients of the linear relation are determined in a calibration procedure comprising the isolated operation of only one light emitter at a time.

12. The illumination device of claim 11, wherein the only one light emitter is measured under different operating conditions during the calibration procedure.

13. The illumination device of claim 1, wherein the illumination device comprises sensor units with different spectral sensitivity.

14. The illumination device of claim 12, wherein the sensor units comprise photodiodes covered with dielectric layers of different material and/or thickness.

15. The illumination device of claim 1, wherein the illumination device comprises a controller that is adapted to drive the at least one light emitter individually based on the estimated characteristic value.

16. The method of claim 2 wherein the illumination device comprises at least two light emitters, and the method includes separately measuring each emitter of the at least two light emitters and estimating the characteristic value of each emitter based on a common set of spectral basis functions.

17. The method of claim 2, wherein the spectral basis functions are chosen with respect to the expected form of the spectrum, including at least one of bell-shaped, piece-wise linear, polynomials and b-splines.

18. The method of claim 2, wherein the number of spectral basis functions is identical to the number of measurement signals.

19. The method of claim 2, wherein the illumination device comprises a plurality of light emitters, and the method includes determining the coefficients in a calibration procedure comprising the isolated operation of only one light emitter at a time.

20. The method of claim 2, wherein the illumination device comprises a plurality of light emitters, and the method includes driving each of the light emitters individually based on the estimated characteristic value.

* * * * *